United States Patent [19]

Laskaris

[11] 3,891,875
[45] June 24, 1975

[54] SUPERCONDUCTING ROTOR

[75] Inventor: Evangelos T. Laskaris, Schenectady, N.Y.

[73] Assignee: General Electric Company, Schenectady, N.Y.

[22] Filed: Oct. 16, 1973

[21] Appl. No.: 406,881

[52] U.S. Cl. .................................. 310/40; 310/52
[51] Int. Cl. ............................. H02k ; H02k 9/00
[58] Field of Search ............ 310/10, 40, 52, 54, 64, 310/165, 261, 264, 265

[56] References Cited
UNITED STATES PATENTS

| | | | |
|---|---|---|---|
| 3,405,290 | 10/1968 | Halas | 310/40 |
| 3,471,726 | 10/1969 | Burnier | 310/10 |
| 3,517,231 | 6/1970 | Massar | 310/52 |
| 3,590,290 | 6/1971 | Ruelle | 310/54 |
| 3,609,418 | 9/1971 | Halas | 310/10 |
| 3,639,793 | 2/1972 | Appleton | 310/10 |
| 3,644,766 | 2/1972 | Hughes | 310/165 |
| 3,648,082 | 3/1972 | MacNab | 310/10 |
| 3,657,580 | 4/1972 | Doyle | 310/52 |
| 3,679,920 | 7/1972 | MacNab | 310/52 |
| 3,745,389 | 7/1973 | Lorch | 310/52 |

FOREIGN PATENTS OR APPLICATIONS

| | | | |
|---|---|---|---|
| 258,404 | 3/1967 | Austria | 310/10 |

*Primary Examiner*—R. Skudy
*Attorney, Agent, or Firm*—John F. Ahern; James W. Mitchell

[57] ABSTRACT

A dynamoelectric machine rotor has a superconducting field winding and a normally conducting amortisseur winding secured to a closed mounting cylinder and is secured interiorly of and coaxially with a support cylinder in fixed relation thereto. A drive shaft is disposed interiorly of one end of the support cylinder and is secured thereto by a first insulating ring. A carrier cylinder is disposed interiorly of the other end of the support cylinder and is mounted thereto by a second insulating ring. The amortisseur winding is secured at one end to the drive shaft and at the other end to the carrier cylinder. An annular space is defined between the field winding and the amortisseur winding with an annular vacuum envelope and radiation shields disposed therein. Cryogenic fluid flows through the field winding and enters axial channels defined by the field winding and support cylinder, from which it flows to annular ducts at both ends of the field winding.

20 Claims, 3 Drawing Figures

SUPERCONDUCTING ROTOR

BACKGROUND OF THE INVENTION

1. Field of the Invention

This invention relates to rotors for dynamoelectric machines, and more particularly to superconducting rotors.

2. Description of the Prior Art

Dynamoelectric machines of the type having rotors with field, or main current carrying, windings are well known to those skilled in the art. The efficiency and capacity of such machines depends on the amount of current the field windings can carry. The discovery that cryogenic temperatures rendered electrical conductors superconducting made it apparent that if field windings of such rotors could be maintained at cryogenic temperatures during operation, their capacity would be virtually limitless.

It is also well known to provide rotors having amortisseur, or damper, windings to provide torque when the rotor is not rotating at synchronous speed. In a motor, such amortisseur windings provide the necessary starting torque; in a generator, the amortisseur windings provide torque when the rotor deviates from a synchronous speed, so that a synchronous speed of rotation is maintained.

Because the amortisseur windings neither carry large amounts of current nor carry current continuously, the capacity of the dynamoelectric machine is not materially affected by the amount of current the amortisseur windings can carry. It is expensive to produce cryogenic fluid in quantity and complex piping systems must be provided to handle such cryogenic fluid. When considering these factors, it is seen to be undesirable to have superconducting amortisseur windings.

However, amortisseur windings, especially in large capacity dynamoelectric machines, generate heat and some type of cooling system is needed. Because superconducting amortisseur windings are economically less advantageous than amortisseur windings which are merely "normally conducting," a fluid such as water may be used to cool the amortisseur windings.

The prior art has not proposed the use of a rotor having a superconducting field winding and also having an amortisseur winding. This is a highly desirable objective since a superconducting field winding will greatly increase the capacity of the machine while the provision of an amortisseur winding will render the machine synchronous.

The present invention proposes a rotor having a field winding and an amortisseur winding with means for maintaining the field winding in a superconducting state and means for maintaining the amortisseur winding in a normally conducting state.

The rotor according to the present invention combines the advantages of having a superconducting field winding with the advantages of having an amortisseur winding, without the necessity of providing complex fluid delivery and heat shielding system for the amortisseur winding. The present invention provides for cooling the amortisseur winding so that heat generated thereby is dissipated, but the cooling system for the amortisseur winding maintains the amortisseur winding in a normally conducting state and therefore is relatively simple in construction. The present invention also includes structure which thermally isolates the superconducting field winding so that it can be more readily maintained in a superconducting state.

SUMMARY OF THE INVENTION

It is a general object of this invention to provide a rotor having a field winding and an amortisseur winding with means for maintaining the field winding in a superconducting state and means for maintaining the amortisseur winding in a normally conducting state.

It is another object of the present invention to provide a rotor having a field winding and an amortisseur winding in which the field winding is thermally isolated from the surrounding environment.

In one embodiment of the invention, a rotor has a field winding and means for maintaining the field winding in a superconducting state. The field winding encircles and is secured to a mounting cylinder which is closed and evacuated, its end closures forming radiation shields. The field winding and mounting cylinder are then secured coaxially with and interiorly of a support cylinder, with axial channels defined between the support cylinder and the field winding. Annular ducts which are in communication with the axial channels are located at either end of the field winding. A first thermally insulative ring means is secured to a drive shaft and to one end of the support cylinder and provides a circuitous heat transfer path therebetween. A second thermally insulative ring means is secured to the other end of the support cylinder and is mounted to a carrier cylinder to provide a circuitous heat transfer path therebetween. The rotor has an amortisseur winding and further includes means for maintaining the amortisseur winding in a normally conducting state. The amortisseur winding encircles the support cylinder so that an annular space is defined therebetween, with an annular vacuum envelope and a radiation shield disposed in the annular space. One end of the amortisseur winding is secured to the carrier cylinder. Cryogenic fluid from a cryogenic fluid source is introduced to the field winding and flows therethrough into the axial channels defined between the support cylinder and the field winding and empties into the annular ducts at either end of the field winding.

BRIEF DESCRIPTION OF THE DRAWINGS

A more complete understanding of this invention may be had by reference to the accompanying specification when taken in conjunction with the drawings of the invention, wherein.

DETAILED DESCRIPTION OF THE INVENTION

Figure 1:
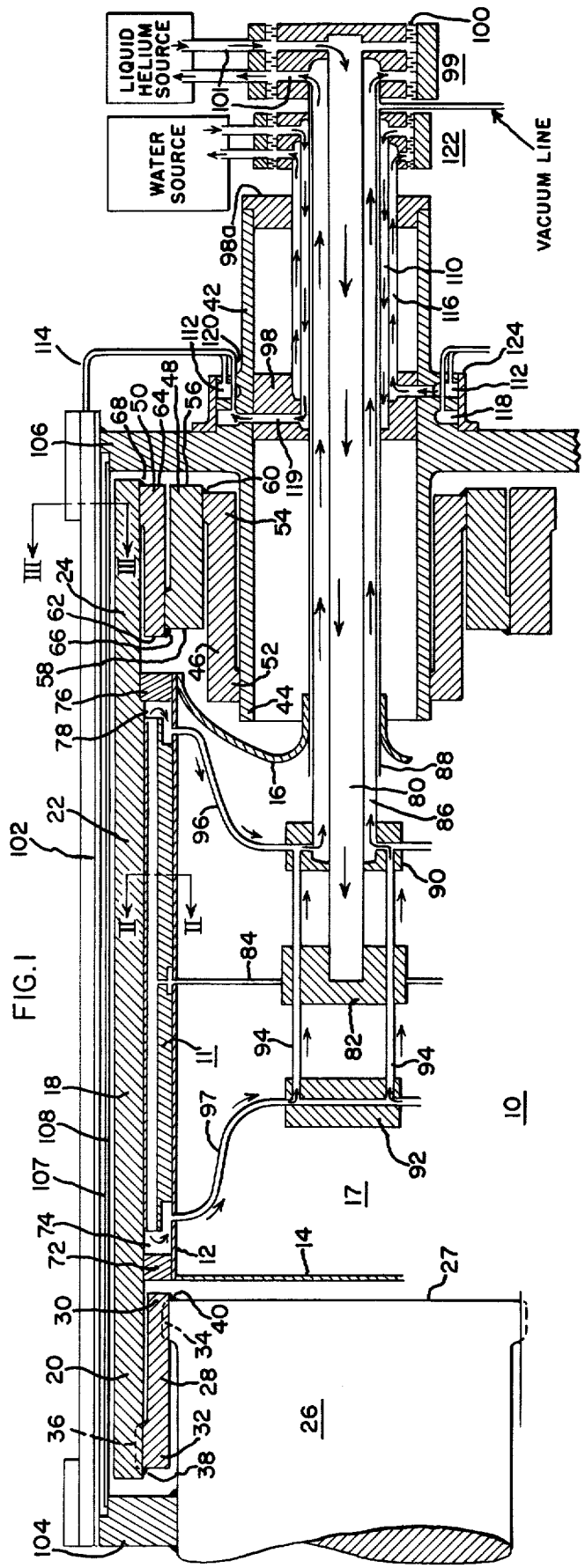
FIG. 1 is a cross-sectional view of a portion of a rotor having a field winding and an amortisseur winding and including means for maintaining the field winding in a superconducting state and means for maintaining the amortisseur winding in a normally conducting state.

Referring now to FIG. 1, a portion of a rotor 10 for use in a dynamoelectric machine is shown. Rotor 10 has a field winding 11 and means for maintaining field winding 11 in a superconducting state. Field winding 11 encircles and is secured to a mounting cylinder 12 which has a first end closure 14 and a second end closure 16. Mounting cylinder 12 and end closures 14 and 16 form a cylindrical envelope 17 which is evacuated. The surfaces of first end closure 14 and second end closure 16 facing into cylindrical vacuum envelope 17 are painted, or otherwise coated, flat black to absorb heat and their surfaces facing to the exterior of cylindrical vacuum envelope 17 are silvered, or otherwise coated, to reflect heat. Thus, end closures 14 and 16 form radiation shields to retard heat radiation to field winding 11.

A support cylinder 18 has a first end portion 20, a middle portion 22 and a second end portion 24. Field winding 11 is secured interiorly of and coaxially with middle portion 22 of support cylinder 18 in fixed relation therewith. Normally, support cylinder 18 will be shrink into field winding 11, but other means of attachment may be used.

A drive shaft 26, which extends interiorly of and coaxially with first end portion 20 of support cylinder 18, is in torque transmitting relation with support cylinder 18, and therefore with field winding 11. The end 27 of drive shaft 26 is secured to first end portion 20 of support cylinder 18 by a first insulating ring means which provides a circuitous heat conducting path therebetween. The first insulating ring means comprises a cylinder 28 which has a first end 30 and a second end 32. First end 30 is secured to drive shaft 26 by spline 34 or other suitable torque transmitting joint, and second end 32 of cylinder 28 is secured to first end portion 20 of support cylinder 18 by spline 36 or other suitable torque transmitting joint. It is desirable to make cylinder 28 as long as possible in order to make the heat conducting path between drive shaft 26 and support cylinder 18 as long as possible. Therefore, it is preferred that drive shaft 26 be disposed in first end portion 20 of support cylinder 18 with end 27 of drive shaft 26 proximate to end closure 14, with first end 30 cylinder 28 secured to the extreme end of drive shaft 26 and second end 32 of cylinder 28 secured to the extreme end of support cylinder 18. Such a construction yields the longest practical heat conducting path between drive shaft 26 and support cylinder 18. Welds 38 and 40 prevent relative axial movement between drive shaft 26 and support cylinder 18. Welding is preferred, but of course other means of securing drive shaft 26 to support cylinder 18 to prevent axial movement therebetween may be used.

End 44 of a carrier cylinder 42 extends interiorly of and coaxially with second end portion 24 of support cylinder 18 and is mounted thereto by a second insulating ring means which provides a circuitous heat conducting path therebetween. The second insulating ring means comprises an innermost cylinder 46, an intermediate cylinder 48 and an outermost cylinder 50. Innermost cylinder 46 has a first end 52 in contact with end 44 of carrier cylinder 42 and a second end 54. The inside diameter of first end 52 is nominally the same as the outside diameter of portion 44 and these diameters are held to as close a tolerance as possible in order to prevent relative radial movement between cylinder 46 and portion 44. However, cylinder 46 and portion 44 are not otherwise secured so that relative axial movement therebetween is possible. Intermediate cylinder 48 has a first end 56 and a second end 58. First end 48 of intermediate cylinder 56 is secured to second end 54 of innermost cylinder 46 by weld 60 or other suitable means. Outermost cylinder 50 has a first end 62 and a second end 64. First end 62 of outermost cylinder 50 is secured to second end 58 of intermediate cylinder 48 by weld 66 or other suitable means and second end 64 of outermost cylinder 50 is secured to second end portion 18 of support cylinder 12 by weld 68 or other suitable means. It is desirable to make cylinders 46, 48 and 50 as long as possible, in order to make the heat conducting path between support cylinder 18 and carrier cylinder 42 as long as possible. Therefore, it is preferred that carrier cylinder 42 be disposed in second end portion 24 of support cylinder with end 44 of carrier cylinder 42 proximate to second end closure 16. First end 52 of innermost cylinder 46 is mounted to end 44 of carrier cylinder 42 and second end 64 of outermost cylinder 50 is mounted to the extreme end of support cylinder 18. Such a construction yields the longest practical heat conducting path between carrier cylinder 42 and support cylinder 18.

A first flange member 72 is secured to support cylinder 18 and mounting cylinder 12 so that a first annular duct 74 is formed at one end of field winding 11 in heat transfer relation therewith. A second flange member 76 is secured to support cylinder 18 and mounting cylinder 12 so that a second annular duct 78 is formed at the other end of field winding 11 in heat transfer relation therewith.

A cryogenic fluid delivery system comprises means for maintaining the field winding in a superconducting state and includes a first tube means for introducing liquid helium, or other suitable cryogenic fluid, to the interior of field winding 11. The first tube means includes an inner tube 80, a supply manifold 82 in communication with inner tube 80, and four flexible cryogenic fluid supply tubes 84 (only two of which are shown for clarity) which communicate between the interior of field winding 11 at a location intermediate of the ends thereof, and supply manifold 82. The cryogenic fluid delivery system also includes a second tube means for providing a flow path for the liquid helium away from field winding 11 after it has circulated through the interior thereof. The second tube means includes an annular passage 86 defined by inner tube 80 and a vacuum outer tube 88, a first return manifold 90 in communication with annular passage 86, a second return manifold 92 in communication with first return manifold 90 through tubes 94, four cryogenic fluid return tubes 96 (only two of which are shown for clarity) which communicate between second annular duct 78 and first return manifold 90, and four cryogenic fluid return tubes 97 (only two of which are shown for clarity) which communicate between first annular duct 74 and second return manifold 92. Inner tube 80 and outer tube 86 extend through second end closure 16 so that most of the cryogenic fluid delivery system is disposed within cylindrical vacuum envelope 17 and vacuum tube 88.

A liquid helium source includes suitable refrigeration equipment (not shown) to enable the liquid helium to be recirculated through field winding 11. The liquid helium source is in communication with cryogenic fluid delivery system through a suitable cryogenic sealing device 99. Cryogenic sealing device 99 is of the type, recognized by those skilled in the art, which allows fluid to be transferred between a stationary source and rotating conduits. Cryogenic sealing device 99 includes the necessary labyrinth seals 100 and ducting 101 to enable liquid helium to be introduced into inner tube 80 from the liquid helium source and to enable liquid helium to enter the liquid helium source from annular passage 86.

Amortisseur winding 102 encircles support cylinder 18 and defines an annular space therebetween. Ring member 104 secures one end of amortisseur winding 102 to drive shaft 26. Ring member 104 is secured to drive shaft 26 and amortisseur winding 102 by any suitable means. The other end of amortisseur winding 102 is secured to carrier cylinder 42 so that drive shaft 26 and carrier cylinder 42 are fixedly secured together. Carrier cylinder 42 includes a flange 106 to which amortisseur winding 102 is secured by any suitable means. Disposed in the annular space defined between amortisseur winding 102 and support cylinder 18 is an annular vacuum envelope 107. Radiation shield means 108 is also disposed in the annular space for retarding heat radiation from amortisseur winding 102 to field winding 11.

A fluid delivery system comprises means for maintaining the amortisseur winding in a normally conducting state and includes a supply system for introducing water, or other suitable cooling fluid, to amortisseur winding 102. The supply system includes an inner annular passage 110, a water supply vessel 112 in communication with inner annular passage 110 through ducts 113 in manifold 98, and cooling fluid supply tubes 114 which communicate between supply vessel 112 and the interior of amortisseur winding 102. The fluid delivery system further includes a return system for providing a flow path for the water away from amortisseur winding 102. The return system includes an outer annular passage 116, a water return vessel 118 in communication with outer annular passage 116 through ducts 119 in insert 98, and cooling fluid return tubes 120 which communicate between return vessel 118 and the interior of amortisseur winding 102.

A water source includes suitable refrigeration equipment (not shown) to enable the water to be recirculated through amortisseur winding 102. The water source is in communication with the fluid delivery system through a sealing device 122 similar to cryogenic sealing device 99 used in conjunction with the cryogenic fluid delivery system and the cryogenic fluid source. Water is introduced into outer annular passage 116 from the water source and returns to the water source from inner annular passage 110 through sealing device 122.

Figure 2:
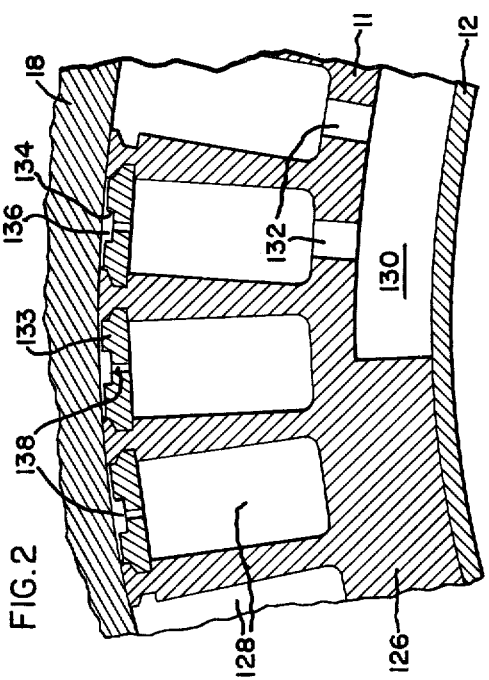
FIG. 2 is a sectional view taken along line II—II in FIG. 1.

Referring now to FIG. 2, the interior of field winding 11 may be more clearly seen. Field winding 11 includes an annular ring 126 having a plurality of axial slots 128 formed therein. Slots 128 have field coils (not shown) disposed therein. Ducting 130 is formed by mounting cylinder 12 and annular ring 126 and communicates with axial slots 128 through apertures 132. Axial wedges 133 close axial slots 128 and retain the field coils against movement due to centrifugal force. Axial wedges 133 have grooves 134 formed therein which define axial channels 136 between field winding 11 and support cylinder 18. Axial channels 136 are in communication with axial slots 128 through apertures 138. Axial channels 136 extend the entire length of field winding 11 and communicate with annular ducts 74 and 78 (shown in FIG. 1) at their respective ends. FIG. 2 shows the interior structure of field winding 11 only at an intermediate axial location thereof, it of course being understood that suitable end structure is provided so that the field coils form the necessary current path to render field winding 11 operative. It is also understood that ducting 130 has a configuration which causes the liquid helium to circulate through all of the axial slots 128.

Figure 3:
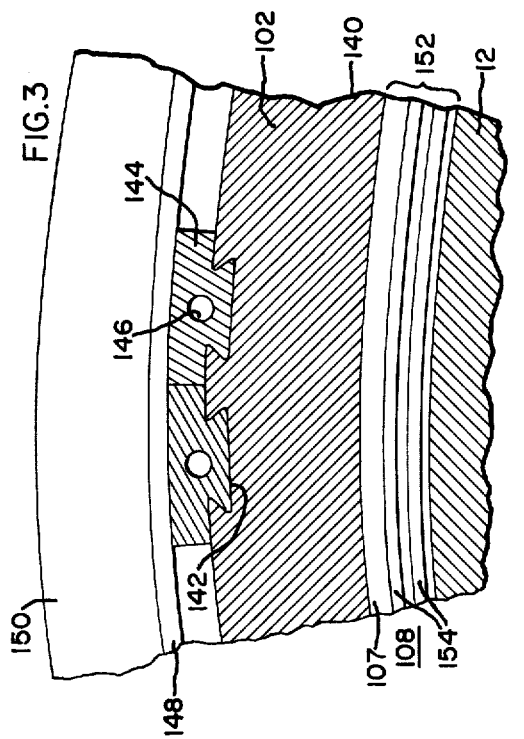
FIG. 3 is a sectional view taken along line III—III in FIG. 1.

Referring now to FIG. 3, the structure of amortisseur winding 102 may be more clearly seen. Amortisseur winding 102 includes a retaining ring 140 which extends the length of amortisseur winding 102 and which has a plurality of axial dovetail slots 142 formed therein to accept amortisseur bars 144. Each amortisseur bar 144 has an axial passage 146 suitably formed therein for carrying water through amortisseur bars 144. An amortisseur ring 148, which short circuits amortisseur bars 144, in a manner well known in the art, is fit over each end of amortisseur winding 102 and a retaining ring 150 is shrink fitted over each amortisseur ring 148. Retaining ring 140 and support cylinder 12 define annular space 152 therebetween. Annular space 152 has disposed therein an annular vacuum envelope 107 and radiation shield means 108, as described in connection with FIG. 1 above. Radiation shield means 108 comprises radiation shields 154. The surface of each radiation shield 154 which faces toward amortisseur winding 102 is silvered, or otherwise coated, to reflect heat and its surface facing toward field winding 11 is painted, or otherwise coated, flat black to absorb heat.

In operation, field winding 11 is superconducting and amortisseur winding 102 is normally conducting. Field winding 11 is rendered superconducting due to the liquid helium circulating therethrough. Liquid helium from the liquid helium source enters inner tube 80 through cryogenic sealing device 99 and flows axially therethrough into supply manifold 82. Supply manifold 82 introduces the liquid helium into cryogenic fluid supply tubes 84 which communicate with ducting 130 through apertures in mounting cylinder 12.

The liquid helium flows outwardly through axial slots 128, through apertures 138 and into axial channels 136. The liquid helium flows axially in both directions toward the ends of field winding 11 and enters annular ducts 74 and 78. Annular duct 74 communicates with cryogenic fluid return tubes 97 through apertures in mounting cylinder 12 and the liquid helium flows through cryogenic fluid return tubes 97 into second return manifold 92 and through tubes 94 into first return manifold 90. Annular duct 78 communicates with cryogenic fluid return tubes 96 through apertures in mounting cylinder 12 and the liquid helium flows through cryogenic fluid return tubes 96 into first return manifold 90. Liquid helium is then returned through outer annular passage 86 to the liquid helium source through cryogenic sealing device 99.

Amortisseur winding 102 is cooled by water circulating therethrough. Water from the water source enters outer annular passage 116 through sealing device 122. From outer annular passage 116 water enters supply vessel 112 and flows to axial passages 146 through cooling fluid supply tubes 114. Water flows axially in one direction through alternate axial passages 146, through suitable passages (not shown) formed at the other end of amortisseur winding 102 and through alternating axial passages 146 into return tubes 120. Cooling fluid return tubes 120 communicate with return vessel 118, from which water flows into inner annular passage 110 and is returned to the water source through sealing device 122.

Carrier cylinder 42 and drive shaft 26 are rigidly connected by amortisseur winding 102. Drive shaft 26 is rigidly connected to support cylinder 18, and therefore to field winding 11, by cylinder 28 which is splined and welded to both support cylinder 18 and drive shaft 26. Because field winding 11 and support cylinder 18 are at extremely low temperatures during operation, they will tend to contract while amortisseur winding 102 will generally be warmer than, or approximately the same as, room temperature. This large difference in temperature will result in differential thermal expansion between the amortisseur winding and the field winding which would cause an overstressed condition if the amortisseur winding and field winding were rigidly connected. By mounting innermost cylinder 46 on portion 44 of carrier cylinder 42 so that relative axial movement is permitted, this differential thermal expansion may take place without introducing stress into the rotor. Also, by forming vacuum envelope 17 which field winding 11 encircles, and enclosing the vacuum envelope with radiation shields, the inside circumference of field winding 11 will be protected from heat radiation. Axial channels 136 and annular ducts 74 and 78 allow the liquid helium, after it has cooled the field coils, to be used in further shielding field winding 11 from exterior heat leaks. The mounting cylinders at either end, which are used to mount field winding 11, retard heat conductance to support cylinder 18. Additional heat protection for field winding 11 is provided by annular vacuum envelope 107 and radiation shields 108 which are disposed in annular space 152 defined by support cylinder 18 and amortisseur winding 102.

Although only one specific embodiment of the invention has been shown, those skilled in the art will perceive modifications other than those specifically pointed out which can be made without departing from the invention, and it is intended by the appended claims to cover all such modifications as fall within the true spirit and scope of the invention.

What is claimed is:

1. A superconducting rotor for a dynamoelectric machine, the superconducting rotor being of the type having a field winding and an amortisseur winding and including:
    a. means for maintaining said field winding in a superconducting state;
    b. means for maintaining said amortisseur winding in a normally conducting state;
    c. a support cylinder having a first end portion, a middle portion, and a second end portion, said field winding being disposed interiorly of and coaxially with said middle portion of said support cylinder in fixed relation thereto;
    d. a drive shaft having a first end disposed interiorly of said first end portion of said support cylinder;
    e. a carrier cylinder having a first end disposed interiorly of said second end portion of said support cylinder, said amortisseur winding fixedly securing said drive shaft to said carrier cylinder;
    f. first insulating ring means for securing said support cylinder to said drive shaft, said first insulating ring means providing a circuitous heat conducting path between said first end of said drive shaft and said first end portion of said support cylinder; and,
    g. second insulating ring means for mounting said support cylinder on said carrier cylinder to allow axial movement therebetween, said second insulating ring means providing a circuitous heat conducting path between said first end of said carrier cylinder and said second end portion of said support cylinder.

2. A superconducting rotor for a dynamoelectric machine, the superconducting rotor being of the type having a field winding and an amortisseur winding and including:
    a. means for maintaining said field winding in a superconducting state;
    b. means for maintaining said amortisseur winding in a normally conducting state;
    c. a support cylinder having a first end portion, a middle portion, and a second end portion, said field winding being disposed interiorly of and coaxially with said middle portion of said support cylinder in fixed relation thereto; said field winding and said support cylinder defining axial channels for providing a fluid flow path for cryogenic fluid therebetween, said axial channels communicating with the interior of said field winding; said field winding having a first end and a second end wherein:
        i. a first annular duct communicates with the axial channels, said first annular duct providing a fluid flow path for cryogenic fluid and being disposed in heat transfer relation with said first end of said field winding;
        ii. a second annular duct communicates with said axial channels, said second annular duct providing a fluid flow path for cryogenic fluid and being disposed in heat transfer relation with said second end of said field winding;
    d. a drive shaft having a first end disposed interiorly of said first end portion of said support cylinder;
    e. a carrier cylinder having a first end disposed interiorly of said second end portion of said support cylinder, said amortisseur winding fixedly securing said drive shaft to said carrier cylinder;
    f. first insulating ring means for securing said support cylinder to said drive shaft, said first insulating ring means providing a circuitous heat conducting path between said first end of said drive shaft and said first end portion of said support cylinder; and,
    g. second insulating ring means for mounting said support cylinder on said carrier cylinder to allow axial movement therebetween, said second insulating ring means providing a circuitous heat conducting path between said first end of said carrier cylinder and said second end portion of said support cylinder.

3. The superconducting rotor recited in claim 2 further including:
    a. a cylindrical vacuum envelope encircled by and in circumferential contact with said field winding, said first annular duct and said second annular duct, said cylindrical vacuum envelope having a first end closure for retarding heat radiation to said field winding and a second end closure for retarding heat radiation to said field winding; and
    b. an annular space defined by said support cylinder and said amortisseur winding, said annular space having disposed therein:
        i. an annular vacuum envelope, and
        ii. radiation shield means for retarding heat radiation from said amortisseur winding to said field winding.

4. The superconducting rotor recited in claim 2 wherein said means for maintaining said field winding in a superconducting state includes a cryogenic fluid delivery system comprising:
  a. a first tube means for introducing cryogenic fluid to the interior of said field winding, said first tube means including:
    i. a cryogenic sealing device for transferring cryogenic fluid between a stationary fluid source and rotating conduits,
    ii. an inner tube communicating with said sealing device,
    iii. a supply manifold communicating with said inner tube, and
    iv. a plurality of cryogenic fluid supply tubes communicating between said supply manifold and the interior or said field winding; and
  b. a second tube means for providing a flow path for cryogenic fluid away from said field winding, said second tube means including:
    i. an outer tube coaxial with said inner tube, said inner tube and said outer tube defining an annular passage,
    ii. at least one return manifold, said annular passage communicating between said sealing device and said return manifold, and
    iii. a plurality of cryogenic fluid return tubes communicating between said first annular duct and said return manifold and said second annular duct and said return manifold.

5. The superconducting rotor recited in claim 3 wherein said means for maintaining said field winding in a superconducting state includes a cryogenic fluid delivery system comprising:
  a. a first tube means for introducing cryogenic fluid to the interior of said field winding, said first tube means including:
    i. a cryogenic sealing device for transferring cryogenic fluid between a stationary fluid source and rotating conduits,
    ii. an inner tube extending through said second end closure and communicating with said sealing device,
    iii. a supply manifold disposed in said cylindrical vacuum envelope, said supply manifold communicating with said inner tube, and
    iv. a plurality of cryogenic fluid supply tubes disposed in said cylindrical vacuum envelope, said supply tubes communicating between said supply manifold and the interior of said field winding; and
  b. a second tube means for providing a fluid flow path for cryogenic fluid away from said field winding, said second tube means including:
    i. an outer tube extending through said second end closure, said outer tube being coaxial with said inner tube and forming an annular passage therebetween;
    ii. at least one return manifold disposed in said cylindrical vacuum envelope, said annular passage communicating between said sealing device and said return manifold;
    iii. a plurality of cryogenic fluid return tubes disposed in said cylindrical vacuum envelope, said cryogenic fluid return tubes communicating between said first annular duct and said return manifold and said second annular duct and said return manifold.

6. The superconducting rotor recited in claim 5 wherein said means for maintaining said amortisseur winding in a normally conducting state includes a fluid delivery system comprising:
  a. a supply system for introducing cooling fluid to said amortisseur winding, said supply system including:
    i. a sealing device for transferring cooling fluid between a stationary fluid source and rotating conduits,
    ii. an inner annular passage communicating with said sealing device,
    iii. a supply vessel communicating with said inner annular passage, and
    iv. a plurality of cooling fluid supply tubes communicating between said supply vessel and said amortisseur winding; and
  b. a return system for providing a flow path for cooling fluid away from said amortisseur winding, said return system including:
    i. an outer annular passage communicating with said sealing device,
    ii. a return vessel communicating with said outer annular passage, and
    iii. a plurality of cooling fluid return tubes communicating between said return vessel and said amortisseur winding.

7. The superconducting rotor recited in claim 5 wherein:
  a. said first insulating ring means includes a cylinder having a first end and a second end, said first end of said cylinder being secured to first end of said drive shaft and said second end of said cylinder being secured to said first end portion of said support cylinder; and
  b. said second insulating ring means includes:
    i. an innermost cylinder encircling said carrier cylinder, said innermost cylinder having a first end mounted to said first end of said carrier cylinder to allow relative axial movement therebetween and a second end,
    ii. an intermediate cylinder encircling said innermost cylinder, said intermediate cylinder having a first end secured to said second end of said innermost cylinder and a second end, and
    iii. an outermost cylinder encircling said intermediate cylinder, said outermost cylinder having a first end secured to said second end of said intermediate cylinder and a second end secured to said second end portion of said support cylinder.

8. The superconducting rotor recited in claim 6 wherein:
  a. said first insulating ring means includes a cylinder having a first end and a second end, said first end of said cylinder being secured to first end of said drive shaft and said second end of said cylinder being secured to said first end portion of said support cylinder; and
  b. said second insulating ring means includes:
    i. an innermost cylinder encircling said carrier cylinder, said innermost cylinder having a first end mounted to said first end of said carrier cylinder to allow relative axial movement therebetween and a second end,
    ii. an intermediate cylinder encircling said innermost cylinder, said intermediate cylinder having a first end secured to said second end of said innermost cylinder and a second end, and iii. an outermost cylinder encircling said intermediate cylinder, said outermost cylinder having a first end secured to said second end of said intermediate cylinder and a second end secured to said second end portion of said support cylinder.

9. The superconducting rotor recited in claim 7 wherein:
a. said first end of drive shaft is disposed proximate to said first end closure; and
b. said first end of said carrier cylinder is disposed proximate to said second end closure.

10. The superconducting rotor recited in claim 8 wherein:
a. said first end of drive shaft is disposed proximate to said first end closure; and
b. said first end of said carrier cylinder is disposed proximate to said second end closure.

11. The superconducting rotor recited in claim 9 wherein:
a. said first end closure includes:
 i. a first surface facing into said cylindrical vacuum envelope, said first surface being coated flat black, and
 ii. a second surface facing away from said cylindrical vacuum envelope, said second surface being silvered;
b. said second end closure includes:
 i. a first surface facing into said cylindrical vacuum envelope, said first surface being coated flat black, and
 ii. a second surface facing away from said cylindrical vacuum envelope, said second surface being silvered; and
c. said radiation shield means includes two radiation shields, each said radiation shield including:
 i. a first surface facing toward said field winding, said first surface being coated a flat black, and
 ii. a second surface facing away from said field winding, said second surface being silvered.

12. The superconducting rotor recited in claim 10 wherein:
a. said first end closure includes:
 i. a first surface facing into said cylindrical vacuum envelope, said first surface being coated flat black, and
 ii. a second surface facing away from said cylindrical vacuum envelope, said second surface being silvered;
b. said second end closure includes:
 i. a first surface facing into said cylindrical vacuum envelope, said first surface being coated flat black, and
 ii. a second surface facing away from said cylindrical vacuum envelope, said second surface being silvered; and
c. said radiation shield means includes two radiation shields, each said radiation shield including:
 i. a first surface facing toward said field winding, said first surface being coated a flat black, and
 ii. a second surface facing away from said field winding, said second surface being silvered.

13. The superconducting rotor recited in claim 11 wherein:
a. said plurality of cryogenic fluid supply tubes is four in number;
b. said return manifold includes:
 i. a first return manifold, and
 ii. a second return manifold in communication with said first return manifold; and
c. said plurality of cryogenic fluid return tubes include:
 i. four cryogenic fluid return tubes communicating between said first return manifold and said second annular duct, and
 ii. four cryogenic fluid return tubes communicating between said second return manifold and said first annular duct.

14. The superconducting rotor recited in claim 12 wherein:
a. said plurality of cryogenic fluid supply tubes is four in number;
b. said return manifold includes:
 i. a first return manifold, and
 ii. a second return manifold in communication with said first return manifold; and
c. said plurality of cryogenic fluid return tubes include:
 i. four cryogenic fluid return tubes communicating between said first return manifold and said second annular duct, and
 ii. four cryogenic fluid return tube communicating between said second return manifold and said first annular duct.

15. A superconducting rotor for a dynamoelectric machine comprising:
a. a support cylinder mounted at one end to a drive shaft and mounted at the other end to a carrier cylinder respectively by first and second insulating ring means; said support cylinder, carrier cylinder and drive shaft being coaxial with one another;
b. a mounting cylinder, coaxial with the support cylinder, carrier cylinder and drive shaft, attached at each end to the support cylinder and disposed interiorly thereof; the interior of said mounting cylinder defining a vacuum chamber;
c. a superconducting field winding disposed between the mounting cylinder and the support cylinder;
d. a normally conducting, liquid cooled amortisseur winding attached at one end to the drive shaft and attached at the other end to the carrier cylinder, said amortisseur winding spaced from the support cylinder in the radial direction and having a radiation shield disposed therebetween; and,
e. axially extending vacuum, liquid coolant and cryogenic fluid channels disposed in the carrier cylinder in communication with the vacuum chamber, amortisseur winding and field winding, respectively.

16. A superconducting rotor for a dynamoelectric machine, said rotor including a superconducting field winding and a normally conducting amortisseur winding; and, further comprising:
a. a carrier cylinder including vacuum, liquid coolant and cryogenic fluid channels; said liquid coolant channels communicating with the amortisseur winding and the cryogenic fluid channels communicating with the field winding;
b. a mounting cylinder, coaxial with the carrier cylinder, the mounting cylinder having an interior portion defining a vacuum chamber in communication with the vacuum channels;

c. a support cylinder concentric to and disposed around the mounting cylinder and spaced therefrom defining annular ducts in communication with said field winding and cryogenic fluid channels; said amortisseur winding surrounding and spaced from the support cylinder and in communication with the liquid coolant channels; and, d. radiation shield means disposed between the support cylinder and amortisseur windings.

17. The superconducting rotor recited in claim 16 wherein the space between the amortisseur winding and support cylinder defines a second vacuum chamber.

18. The superconducting rotor recited in claim 16 further including a drive shaft connected at one end thereof; wherein, the support cylinder is mounted at one end to the drive shaft and at the other end to the carrier cylinder through first and second circuitous insulated ring means respectively.

19. The superconducting rotor recited in claim 18 wherein the amortisseur winding is connected at one end to the drive shaft and at the other end to the carrier cylinder.

20. The superconducting rotor recited in claim 19 wherein the mounting cylinder is connected at either end to the support cylinder.

* * * * *